US006747381B1

(12) United States Patent
Schach et al.

(10) Patent No.: US 6,747,381 B1
(45) Date of Patent: Jun. 8, 2004

(54) SHAFT DRIVE DEVICE

(75) Inventors: Harald Schach, Flacht (DE); Ulrich Haspel, Gemmrigheim (DE); Guenther Ungericht, Nagolg (DE); Waldemar Ernst, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/622,261

(22) PCT Filed: Dec. 7, 1998

(86) PCT No.: PCT/DE98/03585

§ 371 (c)(1),
(2), (4) Date: Oct. 10, 2000

(87) PCT Pub. No.: WO99/41571

PCT Pub. Date: Aug. 19, 1999

(30) Foreign Application Priority Data

Feb. 14, 1998 (DE) ........................................ 198 06 118

(51) Int. Cl.$^{7}$ .......................... H02K 11/00; H02K 5/00; G07D 11/24; G01R 1/04; G01R 1/08

(52) U.S. Cl. ................. 310/89; 310/67 R; 310/DIG. 6; 310/91; 310/254; 116/305

(58) Field of Search ................................ 310/89, 67 R; 368/80; 40/449; 290/1 R; 335/270, 272

(56) References Cited

U.S. PATENT DOCUMENTS

| | | | | | |
|---|---|---|---|---|---|
| 1,364,673 | A | * | 1/1921 | Wood | 310/266 |
| 4,087,713 | A | * | 5/1978 | Binder | 310/266 |
| 4,426,159 | A | * | 1/1984 | Kosaka et al. | 368/80 |
| 4,649,399 | A | * | 3/1987 | Kimura et al. | 346/32 |
| 4,680,514 | A | * | 7/1987 | Sudler | 318/318 |
| 4,758,784 | A | * | 7/1988 | Baker et al. | 324/146 |
| 4,818,911 | A | * | 4/1989 | Taguchi et al. | 310/259 |
| 4,857,784 | A | * | 8/1989 | Mukaekubo | 310/68 B |
| 4,931,679 | A | * | 6/1990 | Fournier | 310/71 |
| 5,093,615 | A | * | 3/1992 | Muto et al. | 324/146 |
| 5,274,288 | A | * | 12/1993 | Stefansky | 310/90 |
| 5,610,459 | A | * | 3/1997 | Izawa | 310/68 R |
| 5,804,895 | A | * | 9/1998 | Tsuzaki et al. | 310/40 |
| 5,977,670 | A | * | 11/1999 | Numaya et al. | 310/49 R |
| 6,031,306 | A | * | 2/2000 | Permuy | 310/67 R |
| 6,130,532 | A | * | 10/2000 | Totsuka | 324/146 |
| 6,216,630 | B1 | * | 4/2001 | Ogawa et al. | 116/284 |
| 6,249,116 | B1 | * | 6/2001 | Miyagawa et al. | 324/146 |
| 6,266,046 | B1 | * | 7/2001 | Arita | 345/156 |
| 6,294,907 | B1 | * | 9/2001 | Koumura et al. | 324/144 |

FOREIGN PATENT DOCUMENTS

| | | | | |
|---|---|---|---|---|
| EP | 0 200 537 | A | | 11/1986 |
| EP | 0777108 | A1 | * | 6/1997 |
| FR | 000746190 | A1 | * | 12/1996 |
| JP | 410104028 | A | * | 4/1998 |
| JP | 411014411 | A | * | 1/1999 |
| JP | 410104276 | A | * | 4/1999 |
| JP | 02001074510 | A | * | 3/2001 |

OTHER PUBLICATIONS

"Surface Mount Coil Gage Mechanism", Research Disclosure No. 306, Oct. 1, 1989, p. 732, XP000085429.

* cited by examiner

*Primary Examiner*—Nestor Ramirez
*Assistant Examiner*—Julio Cesar Gonzalez
(74) *Attorney, Agent, or Firm*—Michael J. Striker

(57) ABSTRACT

With the disclosure shaft drive device, has a PCB device (1, 1'); a rotor device (50; 5, 51) with a rotor (5) and a rotor shaft (51) attached to it; and a stator device (40) for driving the rotor (5) with the rotor shaft (51); an attachment device (60) for attaching the rotor device (50; 5, 51) and the stator device (40) to the PCB device (1, 1') in such a way that the PCB device (5) forms part of the frame, surrounding the rotor shaft, of the shaft drive device.

16 Claims, 5 Drawing Sheets

SHAFT DRIVE DEVICE

BACKGROUND OF THE INVENTION

The present invention relates to a shaft drive device, having: a PCB (printed circuit board) device; a rotor device with a rotor and a rotor shaft attached to it; and a stator device for driving the rotor with the rotor shaft.

Although in principle it can be used for arbitrary shaft drive devices, the present invention and the problems it seeks to solve will be explained in terms of a shaft drive device for use in a gauge/control instrument or combination instrument of a motor vehicle, for instance as a pointer shaft drive device for the pointer of a gauge instrument.

In a modern gauge/control instrument or combination instrument of a motor vehicle, many functions are now provided. Although a number of digital gauge instruments are used, nevertheless for the sake of expediency, some pointer instruments are also used, which each require a pointer shaft drive device.

It is quite conventional to mount such a shaft drive device, for instance a stepping motor, as an independent component on a PCB device and put it in contact with the PCB device. However, this kind of procedure is complicated and expensive from a production standpoint and requires a large amount of space for installation.

The problems the present invention seeks to solve accordingly reside in creating an economical, space-saving and easily installed shaft drive device, in particular for use in a gauge/control instrument or combination instrument of a motor vehicle.

SUMMARY OF THE INVENTION

Accordingly, it is an object of present invention to provide a shaft drive device which avoids the disadvantages of the prior art.

In keeping with these objects and with these objects and with others which will become apparent hereinafter, one feature of present invention resides, briefly stated, in a shaft drive device, which has a printed circuit board device with a dial, a rotor device with a rotor shaft attached to it, a stator device for driving the rotor with the rotor shaft, and an attachment device for attaching the rotor device and the stator device to the printed circuit board in such a way that the printed circuit board device forms a part of a frame surrounding the rotor shaft of the shaft drive deice.

When the shaft drive device is designed in accordance with the present invention it The shaft drive according to the invention has the advantage that it is compact, especially with a low structural height, and can be produced with a smaller number of components. It is easy to put together and simple to contact, for instance by the SMD (surface mounting device) technique. All SMD parts can be assembled automatically, which simplifies manufacture substantially.

The concept on which the present invention is based is that the stator device and the rotor device can be attached to the PCB device in such a way that the PCB device forms part of the frame, surrounding the rotor shaft, of the shaft drive device. In particular, this makes it possible to integrate the axial guidance or bearing of the rotor shaft with the PCB device. Thus the concept according to the invention offers the opportunity of undoing the shaft drive device as an independent component group and partly integrating it into the PCB device instead.

In a preferred refinement, the PCB device has a leadthrough for the rotor shaft. It is thus possible to attach the pointer to the rotor shaft on one side of the PCB device and to provide the rotor and the stator device on the other side.

In a further preferred refinement, in the PCB device an axial bearing bush for cooperation with at least one radial bearing bush provided on the rotor shaft is provided.

In a further preferred refinement, the axial bearing bush is embodied in one piece with the PCB device.

In a further preferred refinement, the axial bearing bush is embodied in an insert that can be received in the PCB device. The stator device can be attached to this insert in advance in a suitable orientation.

In a further preferred refinement, the rotor shaft can be passed through the PCB device from side of the PCB device to a stop, with the rotor remaining on the other side of the PCB device. This simplifies the installation of the rotor shaft, since the stop prevents the rotor shaft from slipping through.

In a further preferred refinement, the stator device can be attached to the PCB device all the way around the leadthrough for the rotor.

In a further preferred refinement, the stator device can be attached to the insert. The insert may be a small precision-manufactured part, to which the stator device can be attached in a precisely calibrated way.

In a further preferred refinement, the attachment device is designed such that it axially supports the rotor shaft on the other side of the PCB device. The force occurring when the pointer is slipped on is thus counteracted.

In a further preferred refinement, the attachment device has a lid, which can be attached to the other side of the PCB device and which has an axial bearing bush for receiving the corresponding end of the rotor shaft. Thus two functions can be united in a single component, namely a bearing function and a protective function.

In a further preferred refinement, the lid can be locked in the PCB device. This is a simple, sturdy way of doing the attaching.

In a further preferred refinement, the stator device can be aligned with the PCB device via an alignment device, preferably centering pins.

In a further preferred refinement, a spacer can be attached between the rotor and the stator device. This spacer assures a correct alignment of the rotor and stator device.

In a further preferred refinement, the stator device can be attached by SMD soldering or adhesive bonding to the wiring of the PCB device.

In a further preferred refinement, the stator device forms a unit, which has a stator coil core region, a stator winding located thereon, and a stator arm region.

BRIEF DESCRIPTION OF THE DRAWINGS

Exemplary embodiments of the invention are shown in the drawings and described in further detail in the description below.

Shown are.

DESCRIPTION OF THE PREFERRED EMBODIMENTS

Figure 1:
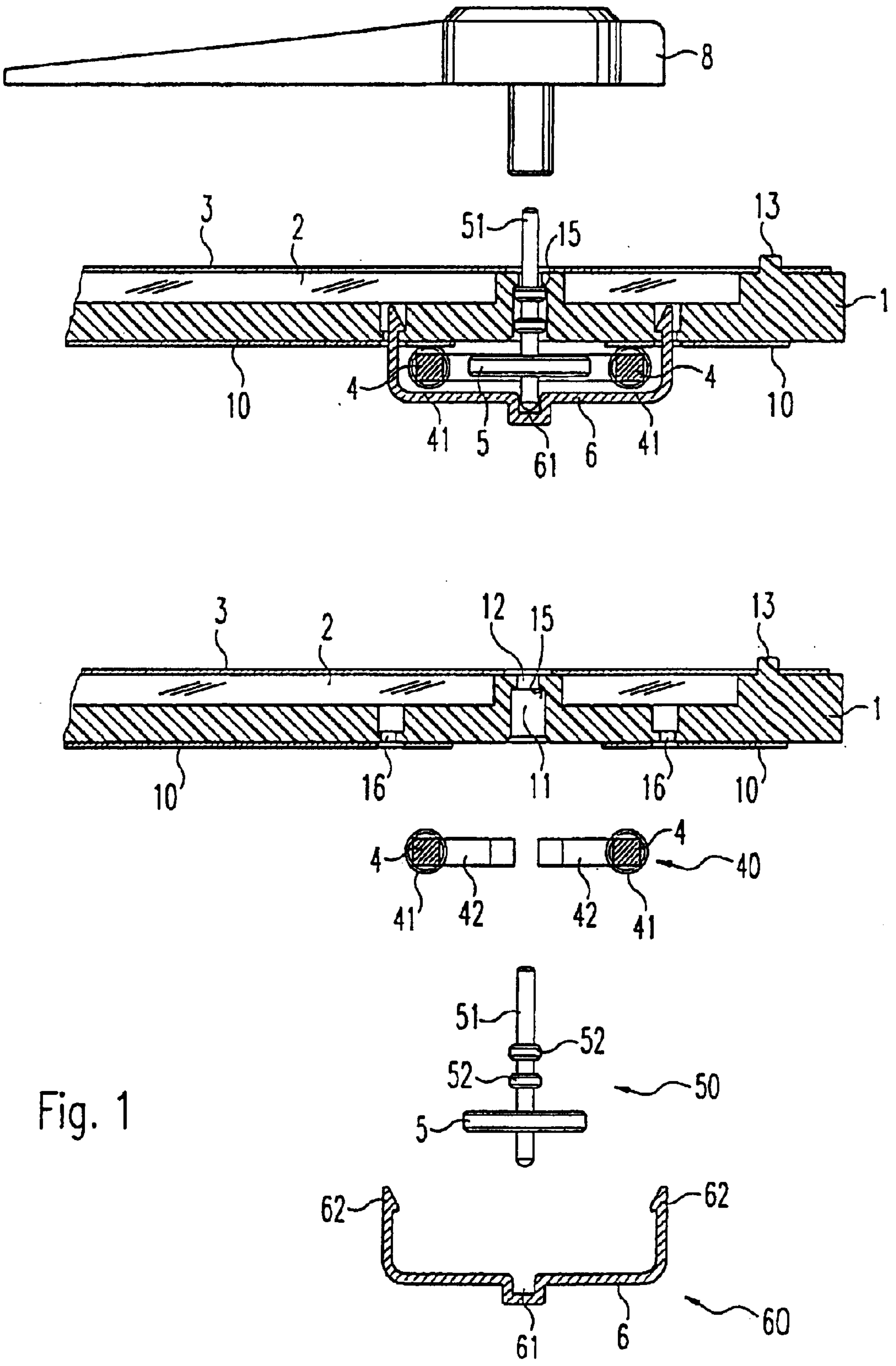
FIG. 1, a cross-sectional view of a first embodiment of the shaft drive device of the invention, in various stages of assembly.

In the drawings, the same reference numerals pertain to identical or functionally identical components.

FIG. 1 is a cross-sectional view of a first embodiment of the shaft drive device of the invention, in various stages of assembly.

FIG. 1 shows a printed circuit board or PCB 1; a luminous disk 2; a dial 3; a stator device 40 with a stator coil core region 4, a stator winding 41, and a stator arm region 42; a rotor device 50 with a rotor 5, a rotor shaft 51, and a double radial bearing bush 52; a pointer 8; wiring 10 of the PCB device 1; a radial bearing bush 11; a leadthrough 12 for the rotor shaft 51; a mounting 13 for the dial 3; a stop 15; one hole 16 for receiving each detent protrusion; an attachment device 60 with a lid 6, an axial bearing bush, and a detent protrusion 62 for the holes 16.

The first embodiment shown in FIG. 1 shows the layout according to the invention of a stepping motor for an electronic combination instrument as a pointer drive mechanism; contacting is provided via the wiring 10 of the PCB device 1. By the partial integration, according to the invention, of the shaft drive device with the PCB device 1, the height of the stepping motor is reduced on the one hand, and its assembly is simplified on the other.

The steps required for assembling the shaft drive device in the first embodiment will now be described in further detail.

On the PCB device 1, the luminous disk 2 and the dial 3 are attached to the front side (the top in FIG. 1). The stator device 40 is also mounted on the back side of the PCB device 1, specifically by an SMD joining method, such as adhesive bonding or soldering.

Care must be taken to provide the correct alignment, that is, the correct spacing between the rotor 5 and the bunching face of the stator arm region 42 for the magnetic field at the rotor 5. To set this spacing correctly, various options exist. In the present example, in reflow soldering or conductive adhesive bonding of the stator device 40 to the PCB device 1, a mounting rotor (not shown) is carried along, in magnetized form, and thus assures the correct spacing during the mounting process. After the mounting process, the mounting rotor is removed again.

Once the stator device 40 has been mounted, the insertion of the rotor device 50 is done, from the back side of the PCB device 1, until the upper radial bearing bush 52 strikes the stop 15 on the upper edge of the radial bearing bush 11. Next, the attachment device 60, which in the present example comprises the lid 6 with the axial bearing bush 61 and the detent protrusions 62, is locked in detent fashion or snapped onto the PCB device 1, in its holes 16.

Once the lid 6 has been mounted on the PCB device 1, the assembly of the stepping motor is concluded, and the assembled component group represents the stepping motor in its known form.

To make the pointer instrument complete, the point 8 is mounted on the rotor shaft 51 from the front side of the PCB device 1. On its other side, the rotor shaft 51 is braced in the axial bearing bush 61 of the lid 6.

Figure 2:
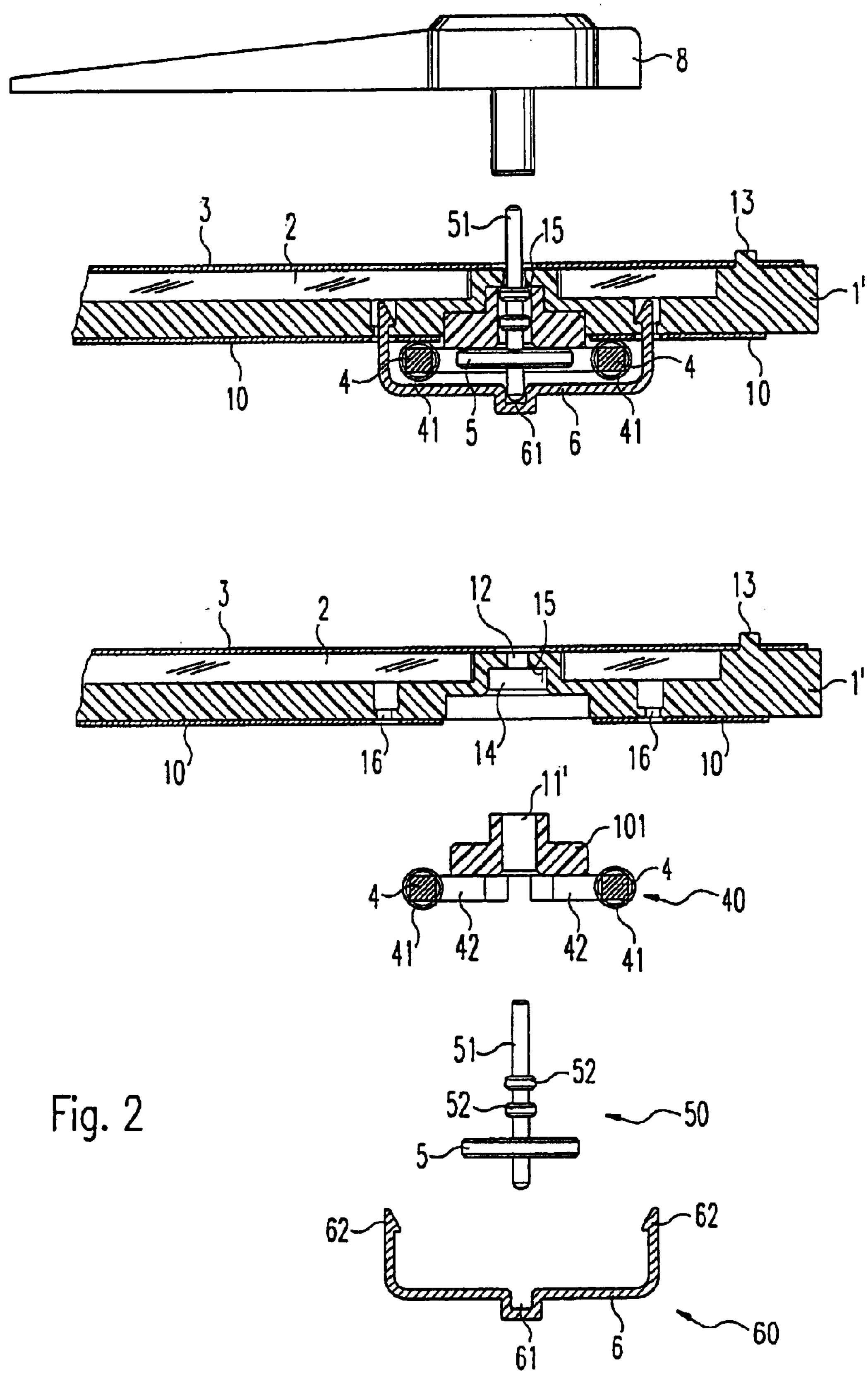
FIG. 2, a cross-sectional view of a second embodiment of the shaft drive device of the invention, in various stages of assembly.

FIG. 2 is a cross-sectional view of a second embodiment of the shaft drive device of the invention, in various stages of assembly.

In FIG. 2, in addition to the reference numerals already given, 1' designates a PCB device embodied differently, that is, with a recess 14, and 101 designates an insert for reception in the recess 14.

In the second embodiment shown in FIG. 2, the axial bearing bush 11' is embodied in an insert 101 that can be received in the recess 14 of the PCB device 1'. The stator device 40, which forms a unit that has the stator coil core region 4, the stator winding 41 located therein, and the stator arm region 42, is attached in advance to the insert 101. Since the insert 101 is small, it can be made from a special, extremely dimensionally precise plastic, which in the final analysis assures the correct disposition on the PCB device 1' and thus the correct spacing between the rotor 5 and the stator unit 40.

The connection between the insert 101 and the PCB device 1' is expediently accomplished both positively and nonpositively by clamping or adhesive bonding or the like.

The remaining layout corresponds to that of the first embodiment in FIG. 1.

Figure 3:
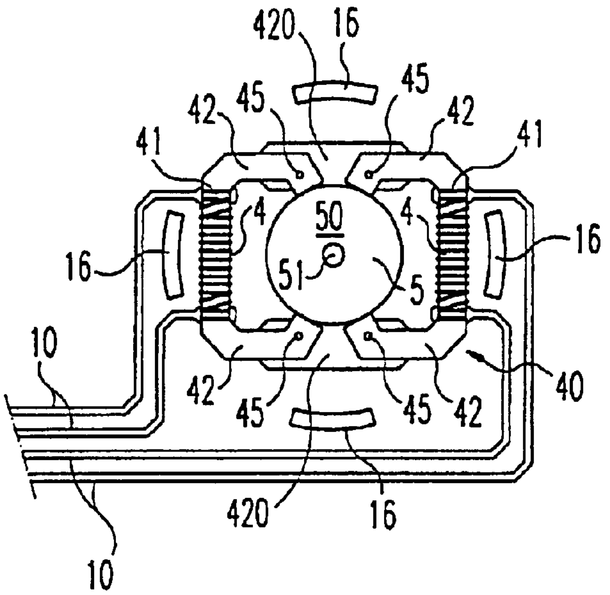
FIG. 3, a view from below of a first example of the stator device, attached to the PCB device and with the rotor device inserted.

FIG. 3 is a view from below of a first example of the stator device, attached to the PCB device and with the rotor device inserted.

In FIG. 3, in addition to the reference numerals already given, 45 indicates an alignment device in the form of centering pins, and 420 indicates a mounting for holding the stator device 40 together.

In the first example of the stator device 40 shown in FIG. 3, the stator arm region 42 extends substantially perpendicular to the stator coil core region 4. The two halves of the stator device 40 are joined via the mounting 420, so that the entire stator device 40 forms a unit, which is attached, aligned by the centering pins 45, to the back side of the PCB device 1.

Figure 4:
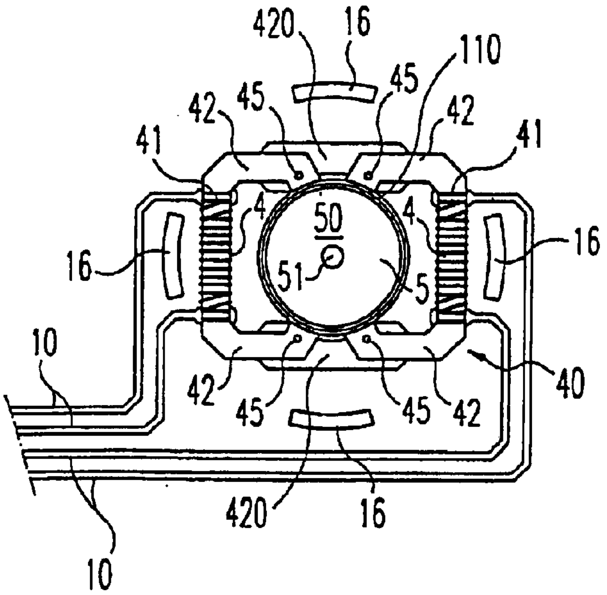
FIG. 4, a view from below of a second example of the stator device, attached to the PCB device and with the rotor device inserted.

FIG. 4 is a view from below of a second example of the stator device, attached to the PCB device and with the rotor device inserted.

In FIG. 4, in addition to the reference numerals already listed, 110 indicates a collar of the PCB device 1 (see FIG. 1) or of the insert 101 (see FIG. 2), which acts as a spacer between the rotor 5 and the stator device 40.

In the second example of the stator device 40 shown in FIG. 4, the spacer 110 is attached between the rotor 5 and the stator device 40, or in other words in the region of the bunching face; the spacer is expediently a thin plastic ring, on which the stator device 40 rests with its bunching face, virtually without tolerances on the principle of a spring. The thickness of the spacer 110 is accordingly selected such that the rotor 5 can rotate without major frictional resistance.

Otherwise, this second is identical to the first example of the stator device 40 described in conjunction with FIG. 3.

Figure 5:
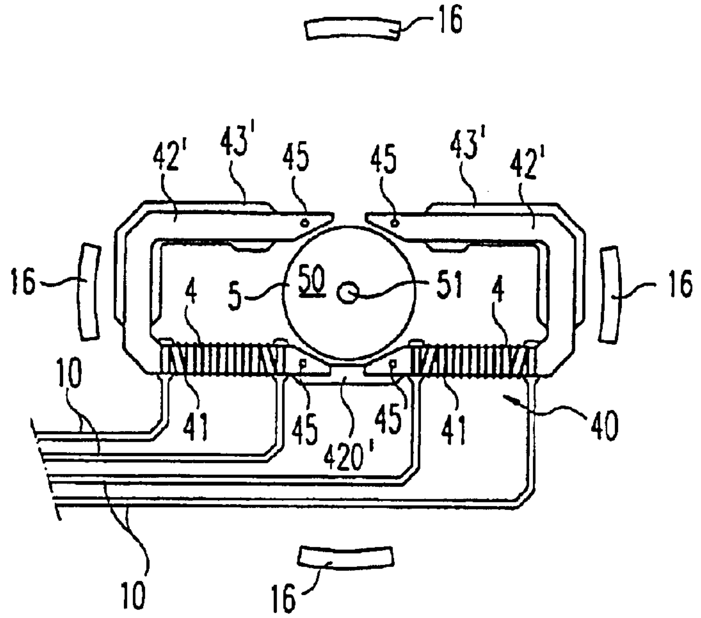
FIG. 5, a view from below of a third example of the stator device, attached to the PCB device and with the rotor device inserted.

FIG. 5 is a view from below of a third example of the stator device, attached to the PCB device and with the rotor device inserted.

In FIG. 5, in addition to the reference numerals already listed, 42' designates a modified stator arm region; 43' designates a setting for the modified stator arm region 43'; and 420' designates a correspondingly modified mounting.

In the third example of the stator device 40 shown in FIG. 5, the two halves of the stator device 40 are U-shaped, but each of the stator windings 41 is located in one leg of the U, or in other words the lower leg in terms of FIG. 5. Also, there is only one mounting 420' for holding together the two halves of the stator device 40. Settings 43' for receiving the stator arm region 42' are additional provided on the back side of the PCB device 1.

Figure 6:
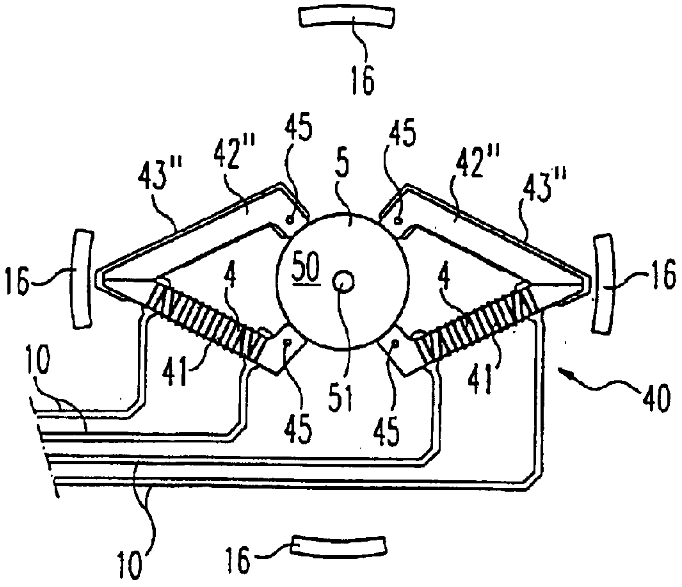
FIG. 6, a view from below of a fourth example of the stator device, attached to the PCB device and with the rotor device inserted.

FIG. 6 is a view from below of a fourth example of the stator device, attached to the PCB device and with the rotor device inserted.

In FIG. 6, in addition to the reference numerals already listed, 42" designates a modified stator arm region and 43" designates a setting for the modified stator arm region 43".

In the fourth example of the stator device 40 shown in FIG. 6, the two halves of the stator device 40 are V-shaped, with the stator winding 41 provided on each leg of the V. In this example, the two halves of the stator device 40 are not joined together; instead, they are fitted into the corresponding fit 43" of the PCB device 1, and the centering pins 45, as in the above cases, assure the correct alignment.

Figure 7:
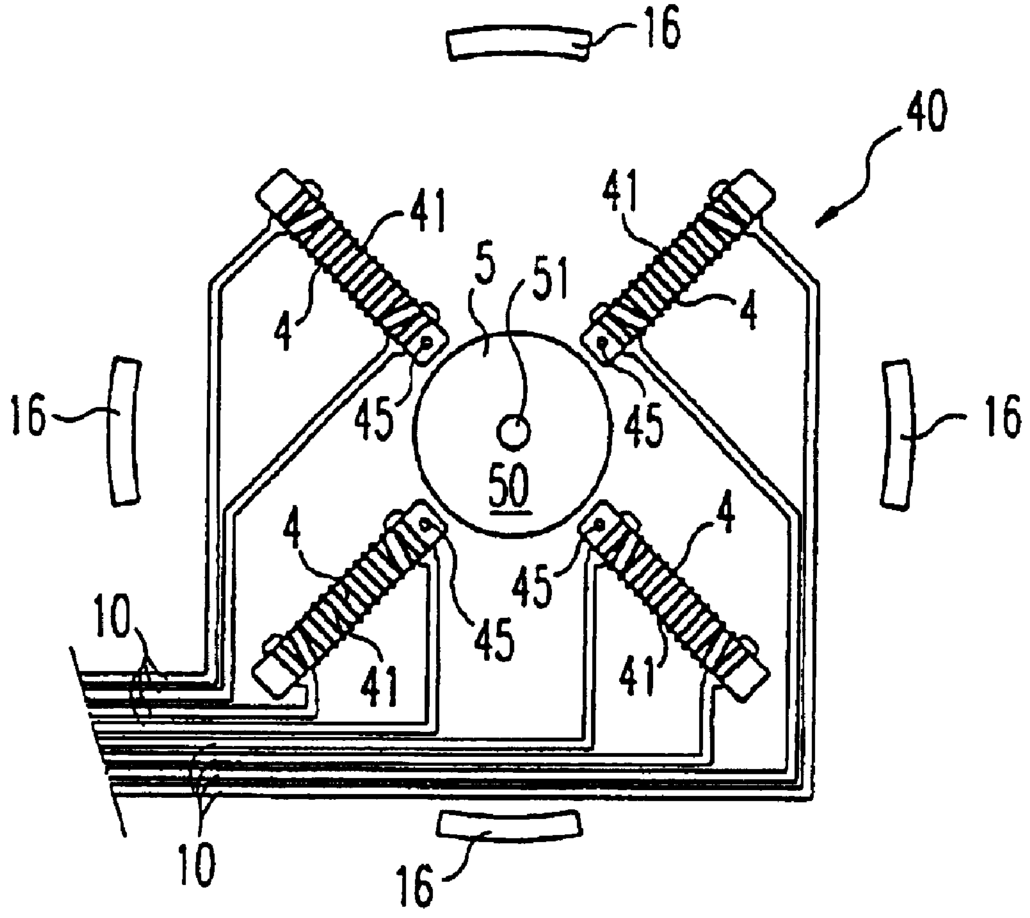
FIG. 7, a view from below of a fifth example of the stator device, attached to the PCB device and with the rotor device inserted.

FIG. 7 is a view from below of a fifth example of the stator device, attached to the PCB device and with the rotor device inserted.

In the fifth example of the stator device 40 shown in FIG. 7, four stator coil core regions 4 with a corresponding stator winding 41 are provided, which are at an angle of 90° from one another and do not cohere with one another but instead are attached individually to the back side of the PCB device 1.

Although the above invention has been described above in terms of preferred exemplary embodiments, it is not limited to them but instead can be modified in manifold ways.

In particular, the shape of the stator device 40 can be varied substantially arbitrarily. It is furthermore possible to make the connection between the stator device 40 and the PCB device 1 in some other way than by the SMD technique. Finally, the pointer 8 can also be attached to the other side of the rotor shaft 51 instead, and in that case the stop 15 acts as an axial bearing. The radial bearing bush can also be attached to the top or the bottom side of the PCB device 1.

What is claimed is:

1. A shaft drive device for a pointer of a gauge instrument, comprising a printed circuit board; a dial arranged on a front side of said printed circuit board in contact with said printed circuit board; a rotor device with a rotor and a rotor shaft attached to said rotor; a pointer arranged on said rotor shaft; a stator device for driving said rotor with said rotor shaft; an attachment device for attaching said rotor device and said stator device to said printed circuit board device in such a way that said printed circuit board device forms a part of a frame surrounding said rotor shaft.

2. A shaft drive device as defined in claim 1, wherein said printed circuit board device has a leadthrough opening, wherein said rotor shaft passes through said leadthrough opening to said dial.

3. A shaft drive device as defined in claim 2, wherein said rotor device is attachable to said printed circuit board device about an entire periphery of said leadthrough opening for said rotor shaft in said printed circuit board device.

4. A shaft drive device as defined in claim 1, wherein said rotor shaft extends through said printed circuit board device from a side of said printed circuit board device to a stop, with said rotor remaining on another side of said printed circuit board device.

5. A shaft drive device as defined in claim 1, wherein said stator device is attached to an insert.

6. A shaft drive device as defined claim 5, wherein said attachment device has a lid formed so that it axially supports said rotor shaft on an opposite side of said printed circuit board device.

7. A shaft drive device as defined in claim 1 and further comprising an aligning device which aligns said stator device with said printed circuit board device.

8. A shaft drive device as defined in claim 7, wherein said aligning device includes centering pins.

9. A shaft drive device as defined in claim 1 and further comprising a spacer attached between said rotor and said stator device.

10. A shaft drive device as defined in claim 1, wherein said stator device is attached to a wiring of said printed circuit board device; and further comprising attaching means for attaching said stator device to said wiring of said printed circuit board device and selected from the group consisting of soldering attaching means and adhesive attaching means.

11. A shaft drive device as defined in claim 1, wherein said stator device is formed as a unit including a stator core coil region, a stator winding location on said stator core coil region, and a stator arm region.

12. A shaft drive device for a pointer of a gauge instrument, comprising a printed circuit board with a dial; a rotor device with a rotor and a rotor shaft attached to said rotor; a pointer arranged on said rotor shaft; a stator device for driving said rotor with said rotor shaft; an attachment device for attaching said rotor device and said stator device to said printed circuit board device in such a way that said printed circuit board device forms a part of a frame surrounding said rotor shaft, said rotor shaft being provided with at least one radial bearing bush, said printed circuit board device having an axial bearing bush cooperating with said at least one radial bearing bush.

13. A shaft drive device as defined in claim 12, wherein said axial bearing bush is formed of one piece with said printed circuit board device.

14. A shaft drive as defined in claim 12, wherein said axial bearing bush is formed as an insert receivable in said printed circuit board device.

15. A shaft drive device for a pointer of a gauge instrument, comprising a printed circuit board with a dial; a rotor device with a rotor and a rotor shaft attached to said rotor; a pointer arranged on said rotor shaft; a stator device for driving said rotor with said rotor shaft; an attachment device for attaching said rotor device and said stator device to said printed circuit board device in such a way that said printed circuit board device forms a part of a frame surrounding said rotor shaft, wherein said stator device is attached to an insert, wherein said attachment device is formed so that it axially supports said rotor shaft on an opposite side of said printed circuit board device, and wherein said attachment device having a lid which is attachable to a side of said printed circuit board device facing away from said tile and which has an axial bearing bush for receiving a corresponding end of said rotor shaft.

16. A shaft drive device for a pointer of a gauge instrument, comprising a printed circuit board with a dial; a rotor device with a rotor and a rotor shaft attached to said rotor; a pointer arranged on said rotor shaft; a stator device for driving said rotor with said rotor shaft; an attachment device for attaching said rotor device and said stator device to said printed circuit board device in such a way that said printed circuit board device forms a part of a frame surrounding said rotor shaft, wherein said printed circuit board has first and second sides, wherein said dial and said pointer are arranged on said first side of said printed circuit board device and wherein said stator device, said rotor device and said lid are arranged on said second side of said printed circuit board.

* * * * *